United States Patent
Liu et al.

(10) Patent No.: US 10,917,872 B2
(45) Date of Patent: Feb. 9, 2021

(54) PAGING OPTIMIZATION METHOD AND APPARATUS

(71) Applicant: ZTE CORPORATION, Guangdong (CN)

(72) Inventors: Xu Liu, Shenzhen (CN); Bo Dai, Shenzhen (CN); Xiubin Sha, Shenzhen (CN)

(73) Assignee: ZTE Corporation, Guangdong (CN)

(*) Notice: Subject to any disclaimer, the term of this patent is extended or adjusted under 35 U.S.C. 154(b) by 0 days.

(21) Appl. No.: 16/480,647

(22) PCT Filed: Dec. 27, 2017

(86) PCT No.: PCT/CN2017/118852
§ 371 (c)(1),
(2) Date: Jul. 24, 2019

(87) PCT Pub. No.: WO2018/137457
PCT Pub. Date: Aug. 2, 2018

(65) Prior Publication Data
US 2020/0187156 A1    Jun. 11, 2020

(30) Foreign Application Priority Data

Jan. 24, 2017 (CN) .......................... 2017 1 0060242

(51) Int. Cl.
*H04W 68/02* (2009.01)
*H04W 76/28* (2018.01)
(Continued)

(52) U.S. Cl.
CPC ......... *H04W 68/02* (2013.01); *H04W 68/005* (2013.01); *H04W 72/1273* (2013.01); *H04W 76/28* (2018.02)

(58) Field of Classification Search
CPC ... H04W 68/02; H04W 68/005; H04W 76/28; H04W 72/1273
See application file for complete search history.

(56) References Cited

U.S. PATENT DOCUMENTS 8,150,477 B2 * 4/2012 Cho .................. H04W 52/0216
455/574
9,380,532 B2 * 6/2016 Xu ....................... H04W 68/005
(Continued)

FOREIGN PATENT DOCUMENTS

| CN | 101483822 A | 7/2009 |
| CN | 102448167 A | 5/2012 |
| CN | 102857869 A | 1/2013 |

OTHER PUBLICATIONS

International Search Report of corresponding PCT Application No. PCT/CN2017/118852—4 pages (dated Feb. 23, 2018).

*Primary Examiner* — Magdi Elhag
(74) *Attorney, Agent, or Firm* — Knobbe Martens Olson & Bear LLP

(57) ABSTRACT

Provided are a paging optimization method and apparatus. The method includes: determining, by a base station, paging types and corresponding paging occasion parameters, where the paging types comprise at least two types; and when transmitting a paging message by the base station, selecting a corresponding paging type and transmitting the paging message at a paging occasion corresponding to the paging type by the base station. Through adopting multiple paging types, different paging messages may correspond to different paging types and different paging occasions, so that the paging resources are effectively saved.

14 Claims, 2 Drawing Sheets

(51) Int. Cl.
*H04W 68/00* (2009.01)
*H04W 72/12* (2009.01)

(56) References Cited

U.S. PATENT DOCUMENTS

| | | | |
|---|---|---|---|
| 2013/0184013 A1 | 7/2013 | Chao et al. | |
| 2014/0038647 A1* | 2/2014 | Zhang | H04W 68/02 |
| | | | 455/458 |
| 2016/0044605 A1* | 2/2016 | Vajapeyam | H04W 52/322 |
| | | | 370/311 |
| 2016/0330791 A1* | 11/2016 | Vajapeyam | H04W 56/0015 |
| 2017/0295608 A1* | 10/2017 | Li | H04W 52/0216 |
| 2018/0098304 A1* | 4/2018 | Reial | H04W 68/005 |
| 2018/0234917 A1* | 8/2018 | Kim | H04W 68/02 |
| 2018/0317198 A1* | 11/2018 | Lee | H04W 68/005 |
| 2019/0223153 A1* | 7/2019 | Kim | H04W 36/00 |

* cited by examiner

PAGING OPTIMIZATION METHOD AND APPARATUS

CROSS REFERENCES TO RELATED APPLICATIONS

This is a U.S. National Stage Application, filed under 35 U.S.C. 371, of International Patent Application No. PCT/CN2017/118852, filed on Dec. 27, 2017, which claims priority to Chinese patent application No. 201710060242.3 filed on Jan. 24, 2017, contents of both of which are incorporated herein by reference in their entireties.

TECHNICAL FIELD

The present invention relates to the field of wireless communications and, in particular, to a paging optimization method and a paging optimization apparatus.

BACKGROUND

The rapid development of mobile Internet, Internet of Things and other service applications has become the main driving force for the development of the fifth generation mobile communication technology (5G). It is badly needed that 5G has an access rate comparable to optical fibers, connectivity of 100 billion devices, perfect real-time experience, and wireless broadband access ability at anytime and anywhere. In addition, energy efficiency, spectral efficiency and peak rate and other important indexes also need to be considered in designing the 5G system. China established the IMT-2020 (5G) Promotion Group in 2013 to promote the development of 5G technology. According to the overall situation in the world, 5G vision, key capability needs and spectrum plan were formed in 2015; 5G standardization work started thereafter and 5G will be put into commercial use after 2020. In terms of international standards, the LTE-Advanced technical standards are mainly formulated by the 3rd Generation Partnership Project (3GPP) International Organization for Standardization. The industry preliminarily believes that research on 5G standards will be started in 3GPP Release 14 (R14).

In future mobile network applications, the demand for traffic, the number of terminals and the types of terminals will all show an explosive growth trend. As one of 5G's important scenes and technologies, Machine Type Communication (MTC) is receiving more and more attention. In an MTC subject, a research sub-topic of the NarrowBand-Internet of Things (NB-IoT) has been proposed for a terminal with low costs and low throughput. That is, a low-throughput wireless communication service is provided for low-cost user equipment (UE) in the NB-IoT by using a 200 kHz spectral bandwidth.

In the LTE system, when data is to be transmitted to a UE (i.e., a terminal) in an idle state (a RRC state is a RRC-IDLE state), a mobility management entity (MME) needs to transmit paging messages to all eNodeBs (i.e., the base station) in a tracking area (TA) registered by the UE. After the eNodeB receive the paging message transmitted by the core network, whether the system message is changed is determined firstly, if the system message is changed, the system message is carried in the paging message together. Then the eNodeB transmits the paging message to notify the UE, as shown in FIG. 1. The UE monitors the paging message at a corresponding position according to a calculation formula of a paging occasion (PO), and initiates a radio resource control (RRC) connection request after receiving the paging message, so as to receive downlink data. After the MME transmits the paging message once, whether the paging is successfully received by the UE is judged according to whether the UE executes corresponding operations. If the UE does not successfully receive the paging, the MME continues to page the UE in a next paging cycle.

As described above, when events such as downlink data arrival and system message change occur, the UE is notified in the paging message manner. The paging message carrying downlink data arrival indication information is triggered by the core network, and the UE needs to monitor a physical downlink control channel (PDCCH) at each paging occasion. According to whether the PDCCH carries a paging-radio network temporary identifier (P-RNTI) matching with the UE, the UE is able to determine whether the paging message is transmitted to the UE itself by this paging. The system message change indication information is triggered by the base station side and transmitted to the UE through the paging message. The current protocol regulates that after the base station receives the paging message transmitted by the core network, whether the system message is changed is determined firstly, if the system message is changed, the system message is carried in the paging message together. A transmission cycle of the paging message, i.e., the aging DRX cycle, paging resources need to be configured for the UE for transmitting the system message change indication information at the paging occasion of each paging DRX cycle. Since the system message change does not necessarily occur at the paging occasion of each paging DRX cycle, especially for the UE whose paging occasion interval DRX cycle value is much smaller than a system message change cycle value, waste of part of paging resources will be caused.

SUMMARY

The present disclosure provides a paging optimization method and a paging optimization apparatus. Through rationally configuring paging resources, the paging resources are saved. In a first aspect, an embodiment of the present disclosure provides a paging optimization method. The method includes: determining, by a base station, paging types and corresponding paging occasion parameters, where the paging types include at least two types; and when transmitting a paging message, selecting a corresponding paging type and transmitting the paging message at a paging occasion corresponding to the paging type, by the base station. The present disclosure further provides a computer storage medium, which is configured to store execution instructions for executing the method described above.

In a second aspect, an embodiment of the present disclosure provides a paging optimization method. The method includes: determining, by a UE, paging types and corresponding paging occasion parameters, where the paging types include at least two types; receiving, by the UE according to a paging type of a paging message, the paging message at a paging occasion corresponding to the paging type.

The present disclosure further provides a computer storage medium, which is configured to store execution instructions for executing the method described above.

In a third aspect, an embodiment of the present disclosure provides a paging optimization apparatus. The method includes: a first determination module, which is configured to determine paging types and corresponding paging occasion parameters, where the paging types include at least two types; and a transmission module, which is configured to, when transmitting a paging message, select a corresponding paging type and transmit the paging message at a paging occasion corresponding to the paging type.

In a fourth aspect, an embodiment of the present disclosure provides a paging optimization apparatus. The apparatus includes: a second determination module, which is configured to determine paging types and corresponding paging occasion parameters, where the paging types include at least two types; and a receiving module, which is configured to receive, according to a paging type of a paging message, the paging message at a paging occasion corresponding to the paging type.

In a fifth aspect, an embodiment of the present disclosure provides a computer-readable storage medium storing computer-executable instructions for executing the paging optimization method described in the first aspect when executed by a processor.

In a sixth aspect, an embodiment of the present disclosure provides a computer-readable storage medium storing computer-executable instructions for executing the paging optimization method described in the second aspect when executed by a processor.

In the embodiments of the present disclosure, the base station determines the paging types and the corresponding paging occasion parameters, where the paging types include at least two types; and when transmitting a paging message, the base station selects a corresponding paging type and transmits the paging message at a paging occasion corresponding to the paging type. Through adopting multiple paging types, different paging messages may correspond to different paging types and different paging occasions, so that the paging resources are effectively saved. Other features and advantages of the present invention will be elaborated hereinafter in the description and, moreover, partially become apparent from the description, or will be understood through implementation of the present invention. The object and other advantages of the present invention may be implemented and obtained through structures set forth in the description, claims and drawings.

BRIEF DESCRIPTION OF DRAWINGS

The drawings are used to understand the technical solutions of the present disclosure, constitute a part of the specification, explain the technical solutions of the present disclosure in conjunction with the embodiments of the present application, and do not limit the technical solutions of the present disclosure.

DETAILED DESCRIPTION

Objects, technical solutions and advantages of the present disclosure will be clearer from a detailed description of embodiments of the present disclosure in conjunction with the drawings. It is to be noted that if not in collision, the embodiments and features therein in the present application may be combined with each other.

The steps shown in the flowcharts of the drawings may be performed by a computer system such as a group of computers capable of executing instructions. Although logical sequences are shown in the flowcharts, the shown or described steps may be performed in sequences different from those described herein in some cases.

In a communication system, when a system message changes, indication information on system message changing may be carried in a paging message transmitted to a UE. After a base station receives a paging message transmitted by a core network, if the system message changes at this time, the base station may carry the indication information on the the system message changing in the paging message and transmit the paging message to the UE. In this mechanism, paging resources need to be configured for all paging occasions to implement transmission of the indication information on the system message changing. In a case where a system message changing cycle is relatively large, configuring the paging resources for all paging occasions for transmitting the indication information on the system message changing obviously results in a large waste. Therefore, it is considerable to configure multiple paging types and configure the multiple paging types with corresponding paging occasion parameters.

Figure 1:
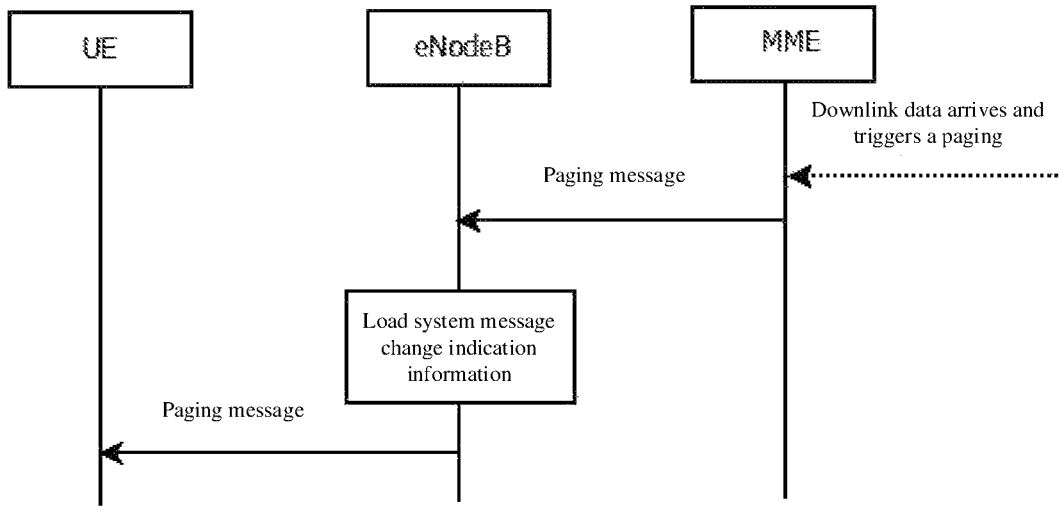
FIG. 1 is a schematic diagram of a paging transmission in an LTE system.
Figure 2:
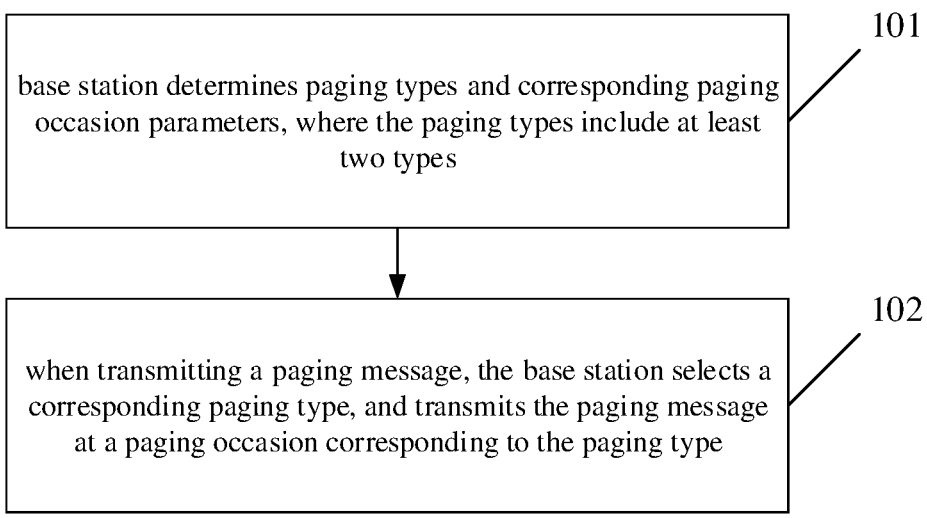
FIG. 2 is a flowchart of a paging optimization method (on a base station side) according to an embodiment of the present disclosure.

As shown in FIG. 2, on a base station side, a paging optimization method according to an embodiment of the present disclosure includes the steps described below.

In step 101, the base station determines paging types and corresponding paging occasion parameters, where the paging types include at least two types.

In step 102, when transmitting a paging message, the base station selects a corresponding paging type, and transmits the paging message at a paging occasion corresponding to the paging type.

In an embodiment, the paging types may include a first paging type and a second paging type, where the first paging type corresponds to a first paging occasion and is for transmitting at least one of: a system message or a UE-specific paging message, the second paging type corresponds to a second paging occasion and is for transmitting a UE-specific paging message.

In step 101, the base station configures the paging types and the corresponding paging occasion parameters; or the base station receives, form a core network, a paging configuration parameter determined through negotiation between a UE and the core network, thereby determining the paging types and the corresponding paging occasion parameters.

The base station may determine a paging occasion parameter corresponding to each paging type according to a predefined rule, where the predefined rule includes: defining a DRX cycle value of the paging occasion corresponding to each paging type, and defining at least one of: a radio subframe number or a radio frame number available for the paging occasion corresponding to each paging type.

When the base station configures the paging types and the corresponding paging occasion parameters, all UEs in a cell may be notified of the paging types and the corresponding paging occasion parameters in a broadcast mode.

The UE in the present disclosure may be an NB-IoT UE.

The paging occasion parameter may include the DRX cycle value of the paging occasion. For the first paging type, the step 101 may include that: the base station configures a DRX cycle value of the first paging occasion according to a related parameter of the system message or a related parameter of the second paging occasion.

The base station may configure the DRX cycle value of the first paging occasion according to one parameter of: a multiple of the system message changing cycle, a multiple of a system message scheduling cycle, and a multiple of a minimum cycle of the second paging occasion.

The system message includes at least one of: a system update indication message or a changed system message.

For the second paging type, the step 101 may include: configuring, by the base station, a DRX cycle value of the second paging occasion according to a related parameter of downlink data.

The base station configures the DRX cycle value of the second paging occasion according to a multiple of an occurrence cycle of the downlink data, or according to a multiple of a downlink data scheduling cycle; or the base station classifies the downlink data according to a time-delay feature of a service type of the downlink data and configures a corresponding DRX cycle value for the second paging occasion.

In step 102, if the first paging occasion and the second paging occasion exist at the same time and the UE supports multi-frequency point receiving, the base station simultaneously transmits a paging message corresponding to the first paging occasion to the UE at the first paging occasion and a paging message corresponding to the second paging occasion to the UE at the second paging occasion; or if the UE does not support multi-frequency point receiving, the base station may preferentially transmit a paging message carrying the system message, and cache a UE-specific paging message in the base station and transmit the UE-specific paging message to the UE at a next paging occasion.

Figure 3:
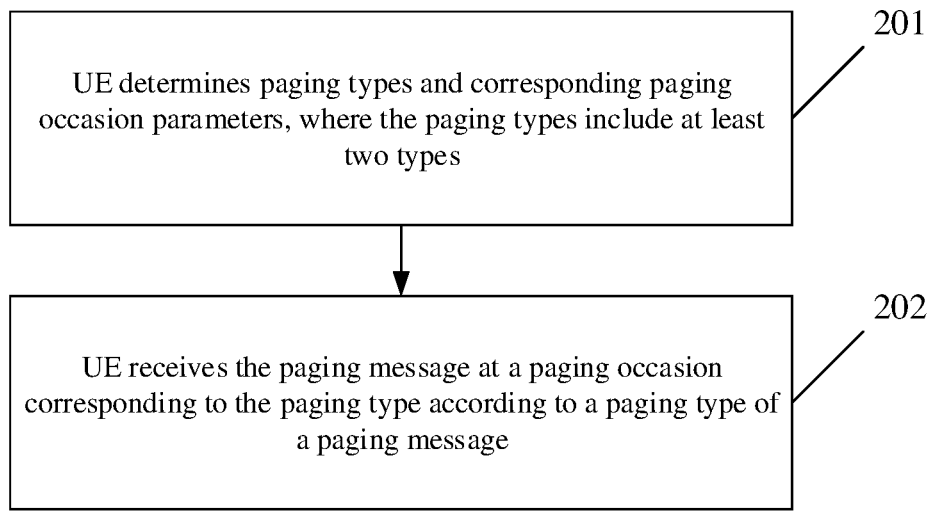
FIG. 3 is a flowchart of a paging optimization method (on a UE side) according to an embodiment of the present disclosure.

In the embodiment of the present disclosure, the base station determines the paging types and the corresponding paging occasion parameters, where the paging types include at least two types; and when transmitting a paging message, the base station selects a corresponding paging type and transmits the paging message at a paging occasion corresponding to the paging type. Through adopting multiple paging types, different paging messages may correspond to different paging types and different paging occasions, so that the paging resources are effectively saved. As shown in FIG. 3, on a UE side, a paging optimization method according to an embodiment of the present disclosure includes the steps described below.

In step 201, the UE determines paging types and corresponding paging occasion parameters, where the paging types include at least two types.

In step 202, the UE receives, according to a paging type of a paging message, the paging message at a paging occasion corresponding to the paging type.

The UE may be an NB-IoT UE.

The paging types include a first paging type and a second paging type, where the first paging type corresponds to a first paging occasion and is for transmitting at least one of: a system message or a UE-specific paging message, the second paging type corresponds to a second paging occasion and is for transmitting the UE-specific paging message.

The step 201 may include that the UE receives a system message carrying paging configuration information and acquires paging types and corresponding paging occasion parameters configured by a base station; or the UE determines a paging configuration parameter through negotiation between the UE and the core network, thereby determining the paging types and the corresponding paging occasion parameters.

The paging occasion parameter may include a DRX cycle value of the paging occasion. In the step 202, the UE acquires a corresponding DRX cycle value of the paging occasion according to the paging type of the paging message, calculates a corresponding paging occasion according to the DRX cycle value of the paging occasion and monitors the paging message at each paging occasion.

In step 202, if the first paging occasion and the second paging occasion exist at the same time and the UE supports multi-frequency point receiving, the UE simultaneously monitors and receives a paging message at the first paging occasion and monitors and receives a paging message at the second paging occasion; or if the UE does not support multi-frequency point receiving, the UE may preferentially receive, at the first paging occasion, a paging message carrying the system message.

In the embodiment of the present disclosure, the UE determines the paging types and the corresponding paging occasion parameters, where the paging types include at least two types; and the UE receives a paging message at a paging occasion corresponding to a paging type according to the paging type of the paging message. Through adopting multiple paging types, different paging messages may correspond to different paging types and different paging occasions, so that the paging resources are effectively saved.

Figure 4:
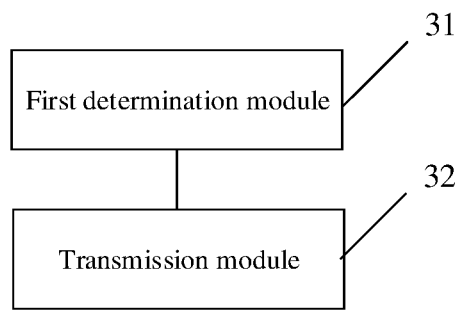
FIG. 4 is a diagram of a paging optimization apparatus (applied to a base station) according to an embodiment of the present disclosure.

As shown in FIG. 4, a paging optimization apparatus according to an embodiment of the present disclosure may be configured to be a base station. The paging optimization apparatus includes a first determination module 31 and a transmission module 32.

The first determination module 31 is configured to determine paging types and corresponding paging occasion parameters, where the paging types include at least two types.

The transmission module 32 is configured to, when transmitting a paging message, select a corresponding paging type, and transmit the paging message at a paging occasion corresponding to the paging type.

Optionally, the paging types include a first paging type and a second paging type, where the first paging type corresponds to a first paging occasion and is for transmitting at least one of: a system message or a UE-specific paging message, the second paging type corresponds to a second paging occasion and is for transmitting the UE-specific paging message.

Optionally, the first determination module 31 includes: a configuration unit and a receiving unit. The configuration unit is configured to configure the paging types and the corresponding paging occasion parameters.

The receiving unit, which is configured to receive, form a core network, a paging configuration parameter determined through negotiation between a UE and the core network, thereby determining the paging types and the corresponding paging occasion parameters.

Optionally, the paging occasion parameter includes a DRX cycle value of the paging occasion. The configuration unit includes a first configuration subunit.

The first configuration subunit is configured to configure a DRX cycle value of the first paging occasion according to a related parameter of the system message or a related parameter of the second paging occasion.

Optionally, the first configuration subunit is further configured to configure the DRX cycle value of the first paging occasion according to one parameter of: a multiple of a system message changing cycle, a multiple of a system message scheduling cycle, and a multiple of a minimum cycle of the second paging occasion.

Optionally, the system message includes at least one of: a system update indication message or a changed system message.

Optionally, the paging occasion parameter include a DRX cycle value of the paging occasion. The configuration unit includes a second configuration subunit.

The second configuration subunit is configured to configure a DRX cycle value of the second paging occasion according to a related parameter of downlink data.

Optionally, the second configuration subunit is further configured to configure the DRX cycle value of the second paging occasion according to a multiple of an occurrence cycle of the downlink data, or according to a multiple of a downlink data scheduling cycle; or the base station classifies the downlink data according to a time-delay feature of a service type of the downlink data and configures a corresponding DRX cycle value for the second paging occasion.

Optionally, the configuration unit is further configured to determine a paging occasion parameter corresponding to each paging type according to a predefined rule, where the predefined rule includes: defining the DRX cycle value of the paging occasion corresponding to each paging type, and defining at least one of: a radio subframe number or a radio frame number available for the paging occasion corresponding to each paging type.

In the embodiment of the present disclosure, through adopting multiple paging types, different paging messages may correspond to different paging types and different paging occasions, so that the paging resources are effectively saved.

Figure 5:
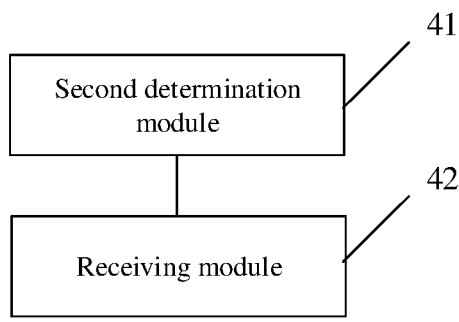
FIG. 5 is a diagram of a paging optimization apparatus (applied to a UE) according to an embodiment of the present disclosure.

As shown in FIG. 5, a paging optimization apparatus according to an embodiment of the present disclosure may be configured to be a UE. The paging optimization apparatus includes a second determination module 41 and a receiving module 42.

The second determination module 41 is configured to determine paging types and corresponding paging occasion parameters, where the paging types include at least two types.

The receiving module 42 is configured to receive, according to a paging type of a paging message, the paging message at a paging occasion corresponding to the paging type.

Optionally, the paging types include a first paging type and a second paging type, where the first paging type corresponds to a first paging occasion and is for transmitting at least one of: a system message or a UE-specific paging message, the second paging type corresponds to a second paging occasion and is for transmitting the UE-specific paging message.

Optionally, the second determination module 41 includes: an acquisition unit and a negotiation unit.

The acquisition unit is configured to receive a system message carrying paging configuration information and acquire paging types and corresponding paging occasion parameters configured by a base station.

The negotiation unit is configured to determine a paging configuration parameter through negotiation with a core network, thereby determining the paging types and the corresponding paging occasion parameters.

Optionally, the paging occasion parameter may include a DRX cycle value of the paging occasion. The receiving module 42 is further configured to acquire a corresponding DRX cycle value of the paging occasion according to the paging type of the paging message, calculate a corresponding paging occasion according to the DRX cycle value of the paging occasion and monitor the paging message at each paging occasion.

In the embodiment of the present disclosure, through adopting multiple paging types, different paging messages may correspond to different paging types and different paging occasions, so that the paging resources are effectively saved.

A computer-readable storage medium is further provided by an embodiment of the present disclosure, which is configured to store computer-executable instructions for executing the paging optimization method as shown in FIG. 2 when executed by a processor.

A computer-readable storage medium is further provided by an embodiment of the present disclosure, which is configured to store computer-executable instructions for executing the paging optimization method as shown in FIG. 3 when executed by a processor.

Apparently, it is to be understood by those skilled in the art that each of the above-mentioned modules or steps of the embodiments of the present disclosure may be implemented by a general-purpose computing apparatus, the modules or steps may be concentrated on a single computing apparatus or distributed on a network composed of multiple computing apparatuses, and optionally, the modules or steps may be implemented by program codes executable by the computing apparatuses, so that the modules or steps may be stored in a storage apparatus and executed by the computing apparatuses. In some circumstances, the illustrated or described steps may be executed in sequences different from those described herein, or the modules or steps may be made into various integrated circuit modules separately, or multiple modules or steps therein may be made into a single integrated circuit module for implementation. In this way, the embodiments of the present invention are not limited to any particular combination of hardware and software.

Although the embodiments disclosed by the present disclosure are as described above, the content thereof is merely embodiments for facilitating the understanding of the present disclosure and is not intended to limit the present disclosure. Any person skilled in the art to which the present disclosure pertains may make any modifications and changes in the forms and details of the implementation without departing from the spirit and range disclosed by the present disclosure, but the patent protection scope of the present disclosure is still subject to the scope defined by the appended claims.

What is claimed is:

1. A paging optimization method, comprising:
   determining, by a base station, paging types and corresponding paging occasion parameters, wherein the paging types comprise at least two types; and
   when transmitting a paging message, selecting a corresponding paging type and transmitting the paging message at a paging occasion corresponding to the paging type, by the base station;
   wherein the paging types comprise a first paging type and a second paging type the first aging type corresponds to a first paging occasion and is for transmitting at least one of: a system message or a UE-specific paging message, and the second paging type corresponds to a second paging occasion and is for transmitting a UE-specific paging message;
   wherein determining, by the base station, the paging types and the corresponding paging occasion parameters comprise:

configuring, by the base station, the paging types and the corresponding paging occasion parameters; or receiving, by the base station from a core network, a paging configuration parameter determined through negotiation between a UE and the core network, to determine the paging types and the corresponding paging occasion parameters;

wherein the paging occasion parameter comprises a discontinuous reception (DRX) cycle value of a paging occasion, and the configuring, by the base station, the paging types and the corresponding paging occasion parameters comprises:

configuring, by the base station, a DRX cycle value of the first paging occasion according to a related parameter of the system message or a related parameter of the second paging occasion.

2. The paging optimization method of claim 1, wherein the configuring, by the base station, the DRX cycle value of the first paging occasion according to the related parameter of the system message or the related parameter of the second paging occasion comprises:

configuring, by the base station, the DRX cycle value of the first paging occasion according to one parameter of: a multiple of a system message changing cycle, a multiple of a system message scheduling cycle, and a multiple of a minimum cycle of the second paging occasion.

3. The paging optimization method of claim 1, wherein the system message comprises at least one of: a system update indication message or a changed system message.

4. The paging optimization method of claim 1, wherein the paging occasion parameter comprises a DRX cycle value of a paging occasion, and configuring, by the base station, at least two paging types and the corresponding paging occasion parameters comprises:

configuring, by the base station, a DRX cycle value of the second paging occasion according to a related parameter of downlink data.

5. The paging optimization method of claim 4, wherein the configuring, by the base station, the DRX cycle value of the second paging occasion according to the related parameter of the downlink data comprises:

configuring, by the base station, the DRX cycle value of the second paging occasion according to a multiple of an occurrence cycle of the downlink data, or according to a multiple of a downlink data scheduling cycle; or classifying, by the base station, the downlink data according to a time-delay feature of a service type of the downlink data and configuring, by the base station, a corresponding DRX cycle value of the second paging occasion.

6. The paging optimization method of claim 1, wherein the configuring, by the base station, the paging types and the corresponding paging occasion parameters comprises:

determining, by the base station, a paging occasion parameter corresponding to each paging type according to a predefined rule, wherein the predefined rule comprises: defining a DRX cycle value of a paging occasion corresponding to each paging type, and defining at least one of: a radio subframe number or a radio frame number available for the paging occasion corresponding to each paging type.

7. A paging optimization method, comprising:
determining, by a user equipment (UE), paging types and corresponding paging occasion parameters, wherein the paging types comprise at least two types; and receiving, by the UE according to a paging type of a paging message, the paging message at a paging occasion corresponding to the paging type, wherein the paging types comprise a first paging type and a second paging type, the first paging type corresponds to a first paging occasion and is for transmitting at least one of: a system message or a UE-specific paging message, and the second paging type corresponds to a second paging occasion and is for transmitting a UE-specific paging message, wherein determining, by the UE, the paging types and the corresponding paging occasion parameters comprise:

receiving, by the UE, a system message carrying paging configuration information, and acquiring paging types and corresponding paging occasion parameters configured by a base station; or determining, by the UE, a paging configuration parameter through negotiation between the UE and a core network, to determine the paging types and the corresponding paging occasion parameters, wherein the paging occasion parameter comprises a discontinuous reception (DRX) cycle value of a paging occasion, and a DRX cycle value of the first paging occasion is configured by the base station according to a related parameter of the system message or a related parameter of the second paging occasion.

8. The paging optimization method of claim 7, wherein the receiving, by the UE according to the paging type of the paging message, the paging message at the paging occasion corresponding to the paging type comprises:

acquiring, by the UE, a corresponding DRX cycle value of the paging occasion according to the paging type of the paging message, calculating, by the UE, a corresponding paging occasion according to the DRX cycle value of the paging occasion and monitoring, by the UE, the paging message at each paging occasion.

9. A paging optimization apparatus, comprising:
a first determination module, which is configured to determine paging types and corresponding paging occasion parameters, wherein the paging types comprise at least two types; and
a transmission module, which is configured to, when transmitting a paging message, select a corresponding paging type and transmit the paging message at a paging occasion corresponding to the paging type;
wherein the paging types comprise a first paging type and a second paging type, the first paging type corresponds to a first paging occasion and is for transmitting at least one of: a system message or a UE-specific paging message, and the second paging type corresponds to a second paging occasion and is for transmitting a UE-specific paging message;

wherein the first determination module comprises:
a configuration unit, which is configured to configure the paging types and the corresponding paging occasion parameters; or
a receiving unit, which is configured to receive form a core network, a paging configuration parameter determined through negotiation between a UE and the core network, to determine the paging types and the corresponding paging occasion parameters;

wherein the paging occasion parameter comprises a discontinuous reception (DRX) cycle value of a paging occasion, and the configuration unit comprises:
a first configuration subunit, which is configured to configure a DRX cycle value of the first paging occasion according to a related parameter of the system message or a related parameter of the second paging occasion.

10. The paging optimization apparatus of claim 9, wherein
the first configuration subunit is further configured to configure the DRX cycle value of the first paging occasion according to one parameter of: a multiple of a system message changing cycle, a multiple of a system message scheduling cycle, and a multiple of a minimum cycle of the second paging occasion.

11. The apparatus of claim 10, wherein the paging occasion parameter comprises a DRX cycle value of a paging occasion, and the configuration unit comprises:
a second configuration subunit, which is configured to configure a DRX cycle value of the second paging occasion according to a related parameter of downlink data.

12. The paging optimization apparatus of claim 11, wherein the second configuration subunit is further configured to:
configure the DRX cycle value of the second paging occasion according to a multiple of an occurrence cycle of the downlink data, or according to a multiple of a downlink data scheduling cycle; or enable a base station to classify the downlink data according to a time-delay feature of a service type of the downlink data and configure a corresponding DRX cycle value of the second paging occasion.

13. A paging optimization apparatus, comprising:
a second determination module, which is configured to determine paging types and corresponding paging occasion parameters, wherein the paging types comprise at least two types; and a receiving module, which is configured to receive, according to a paging type of a paging message, the paging message at a paging occasion corresponding to the paging type;

wherein the paging types comprise a first paging type and a second paging type, the first paging type corresponds to a first paging occasion and is for transmitting at least one of: a system message or a UE-specific paging message, and the second paging type corresponds to a second paging occasion and is for transmitting a UE-specific paging message;

wherein the second determination module comprises: an acquisition unit, which is configured to receive a system message carrying paging configuration information and acquire paging types and corresponding paging occasion parameters configured by a base station; or a negotiation unit, which is configured to determine a paging configuration parameter through negotiation with a core network, to determine the paging types and the corresponding paging occasion parameters;

wherein the paging occasion parameter comprises a discontinuous reception (DRX) cycle value of a paging occasion, and a DRX cycle value of the first paging occasion is configured by the base station according to a related parameter of the system message or a related parameter of the second paging occasion.

14. A non-transitory computer storage medium storing executive instructions, wherein the executive instructions are configured to execute the method of claim 1.

* * * * *

UNITED STATES PATENT AND TRADEMARK OFFICE
CERTIFICATE OF CORRECTION

PATENT NO. : 10,917,872 B2
APPLICATION NO. : 16/480647
DATED : February 9, 2021
INVENTOR(S) : Liu et al.

It is certified that error appears in the above-identified patent and that said Letters Patent is hereby corrected as shown below:

In the Claims

Column 8, Line 59, Claim 1, delete "type" and insert --type,--.

Column 8, Line 59, Claim 1, delete "aging" and insert --paging--.

Column 10, Line 58, Claim 9, delete "receive" and insert --receive,--.

Column 11, Line 11, Claim 11, delete "10," and insert --9,--.

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*